UNITED STATES PATENT OFFICE.

JOSEPH E. BECK, OF NEW ORLEANS, LOUISIANA.

PLASTIC COMPOSITION.

No. 834,101.

Specification of Letters Patent.

Patented Oct. 23, 1906.

Application filed January 23, 1906. Serial No. 297,459.

*To all whom it may concern:*

Be it known that I, JOSEPH E. BECK, a citizen of the United States, and a resident of New Orleans, in the parish of Orleans and State of Louisiana, have invented an Improved Plastic Composition, of which the following is a specification.

My invention is an improved composition for use in an article similar to linoleum and for various analogous purposes.

The ingredients of the composition and the manner of producing it are as follows: The chief ingredient of the composition is derived from bagasse, or what is frequently termed "sugar-cane trash," it being the stalks of the sugar-cane which have been passed through the mill for the purpose of crushing the same and pressing out the juices. Five pounds of dried bagasse are cut up into small pieces—say from one-fourth of an inch to one-half inch in dimension—and the same is placed in two gallons of boiling water, together with a pint of hydrochloric acid, and the solution is boiled for a considerable time, the acid meanwhile acting upon the hard, flinty, or silicious coating of the bagasse, so as to separate or aid in separating it from the softer interior portion. One pound of potash is added to the solution and the boiling continued with agitation by means of a wooden stirrer. The bagasse is then removed and pressed to eliminate the liquid portion as much as practicable. It is then rinsed or washed several times with clear water and then repressed. The comparatively dry bagasse product thus obtained is placed in another boiler containing a gallon of water in which one-half pound of chlorid of lime has been dissolved. It is boiled in this solution for thirty minutes, then removed and rinsed in several clear waters, and finally subjected to a high pressure for the purpose of eliminating the liquid, after which the comparatively dry product is passed through a sieve for the purpose of separating the coarser portion from the finer or pulpy portion. The latter is then mixed with other ingredients, as follows: bagasse product, fifty per cent., by weight; boiled linseed-oil, fifteen per cent., by weight; liquid or dissolved rubber, fifteen per cent., by weight; rice-flour, seven and one-half per cent., by weight; wheat-flour, seven and one-half per cent., by weight; silicate of soda, five per cent., by weight. These ingredients are thoroughly mixed together by stirring, and the composition is then ready for use. The rubber referred to may be formed by dissolving the natural product in any of the well-known solvents. It is used with the silicate chiefly as a binder and the flour as a body or filling.

The product has when warmed a strong adhesive quality, which enables it to be applied and adhere to canvas, burlap, or other fabric, which serves as a backing, and to be so treated as to form any desired geometrical or other figure or the appearance of blocks, &c. It may also be utilized without the backing as a covering for floors and walls, also for wainscoting. To produce a substitute for linoleum, the required thickness of the material having been applied to the backing, the same is run through a hydraulic press in order to give it due solidity and coherence. The composition is cheap and very durable, and it may be easily applied in various situations.

Having thus described my invention, what I claim as new, and desire to secure by Letters Patent, is—

1. The improved plastic composition comprising a product consisting of the finer portion of bagasse, linseed-oil, dissolved rubber, rice and wheat flour, and silicate of soda, substantially in the proportions specified.

2. The improved plastic composition formed of the finer portion of bagasse, an oil, a rubber solution, a soda silicate, and a cereal product serving as a filling, substantially as described.

JOSEPH E. BECK.

Witnesses:
HENRY L. SARPY,
T. R. DUPLANTIER.